United States Patent [19]

Cain

[11] 4,401,568
[45] Aug. 30, 1983

[54] APPARATUS FOR PROCESSING FLUSHING LIQUOR FROM COKE OVENS

[75] Inventor: George R. Cain, Pittsburgh, Pa.
[73] Assignee: Koppers Company, Inc., Pittsburgh, Pa.
[21] Appl. No.: 334,127
[22] Filed: Dec. 24, 1981
[51] Int. Cl.³ .............................................. B01D 21/18
[52] U.S. Cl. .................................... 210/515; 210/520; 210/522; 210/525; 210/535; 210/537
[58] Field of Search .................. 202/270; 210/45, 515, 210/519, 520, 523, 525, 532.1, 533, 534, 535, 537, 706, 521, 522; 196/46, 155

[56] References Cited
U.S. PATENT DOCUMENTS

Re. 28,323  1/1975  Silva .................................... 210/706
885,451   4/1908  Deming ............................... 210/537
1,069,789  8/1913  Kelly ................................... 210/537

Primary Examiner—Frank Sever
Attorney, Agent, or Firm—Daniel J. Long; Herbert J. Zeh, Jr.

[57] ABSTRACT

A coke oven flushing liquor decanter apparatus that has a vertically elongated vessel that has a variable cross-sectional dimension so as to separate the flushing liquor into a lower liquid phase and an upper liquid phase. A vertical tube extends downwardly into the tar phase and a second vertical, downwardly extending tube concentrically surrounds the first vertical tube but concentrically surrounds the first vertical tube but does not extend into the tar phase. A lateral tube connects with first lateral tube in the tar phase to remove tar from the vessel, and a second lateral tube connects with the second vertical tube in the liquid from the vessel.

9 Claims, 1 Drawing Figure

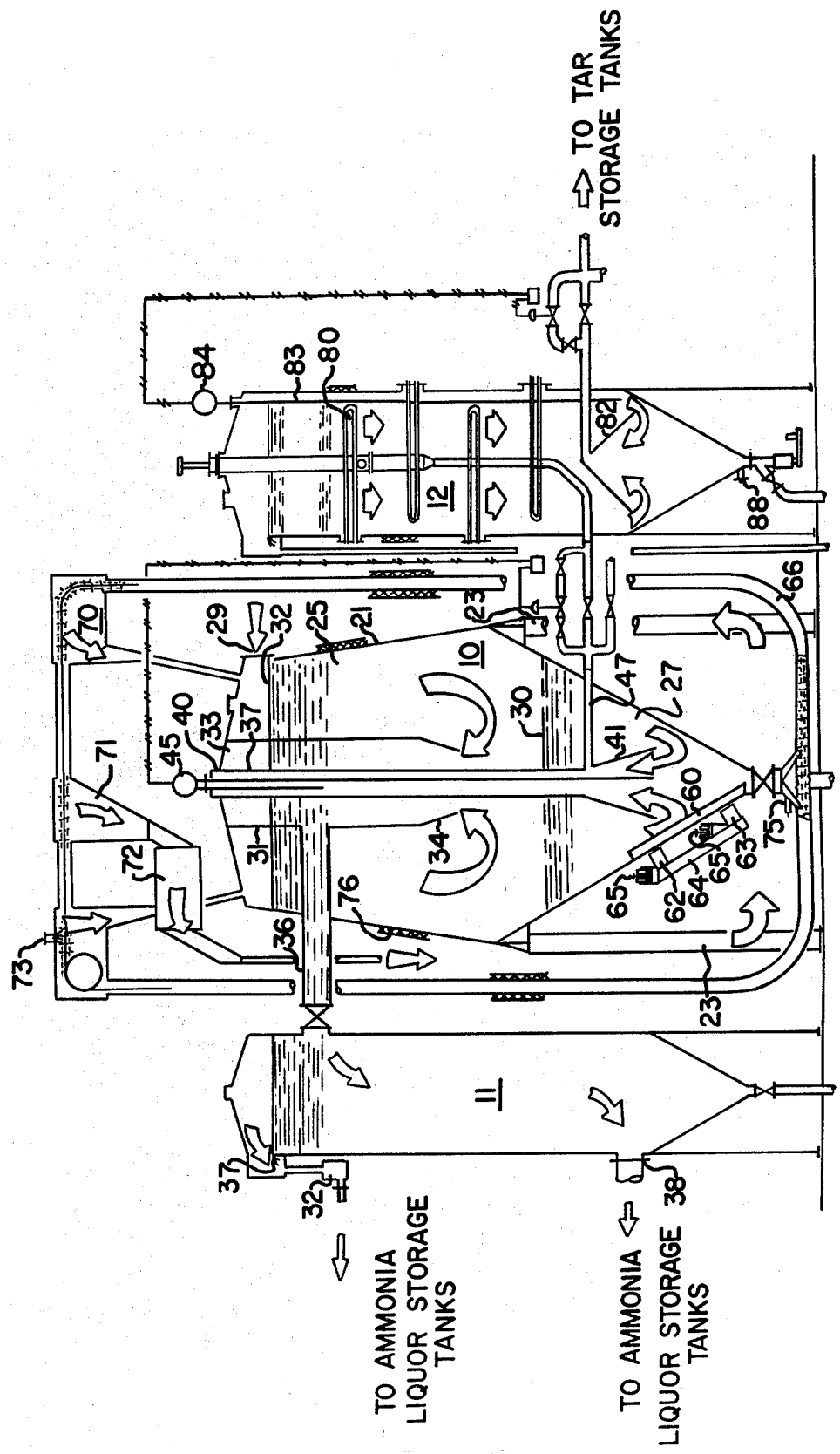

APPARATUS FOR PROCESSING FLUSHING LIQUOR FROM COKE OVENS

BACKGROUND OF THE INVENTION

1. Field of the Invention

The present invention relates to an apparatus for processing flushing liquor from a gas main of a coke oven to provide a watery liquid essentially free of tar and solid particles for continued use to flush such gas mains and to provide tar which is essentially free of solid particles and water.

2. Description of the Prior Art

In the production of coke from coal in coke ovens, gases are liberated from the coal. These gases are collected in a relatively large main that extends along the length of the coke oven battery and are subjected to aqueous sprays of a liquid known as flushing liquor.

The aqueous spray cools the gases and condenses the steam and tar portions of the gases. The tar is insoluble in water. Consequently, a two-phase liquid stream containing tar and aqueous flushing liquor is produced. The tar is a heavy, viscous mixture of hydrocarbons having a specific gravity in a range of about 1.1 to 1.25. The solids, of course, are heavier. The flushing liquor is an aqueous solution containing ammonia, tar acids, such as phenol, and combined ammonia such as ammonium chloride.

The primary purpose of the decanter tank is to separate tar and flushing liquor by settling as the difference in density of the tar and flushing liquor permits; however, it must also remove the solid materials. The densities are such that water forms the upper layer, tar the lower layer, and the solids collect at the bottom of the vessel. The solid materials are undesirable in either the tar or the liquor fraction. The flushing liquor is recycled to the collector main for use in cooling further gases that are being produced during the coking operation.

The decanter tanks have heretofore been rectangular in shape, long and flat. This configuration has given ample settling time and area. However, recent changes in the coking industry due to expansion, government regulations, and increased energy prices have made such types of decantation equipment disadvantageous.

SUMMARY OF THE INVENTION

The present invention processes flushing liquor by a construction and arrangement of an apparatus that occupies far less floor space than known apparatus.

In accordance with the invention, the decanting vessel is of a basic vertical design of circular cross section. This design permits economies of material requirements per unit volume of processed liquor as compared to conventional low, flat decanter tanks of rectangular cross section.

System heat loss is reduced because the vessel has less exposed surface per unit volume of liquor contained in the vessel. The vertical circular vessels permits a reduction in yard space requirements when compared to other vessels performing the same function, yet the invention provides for the employment of the proven basic decanting phenomena while retaining available system hydraulic heads for flows of the existing products.

A further feature of the invention includes an internal tar scraper which is moved by magnets mounted external to the vessel shell. Magnets are fixed on a carriage which negotiates a circular track. As the magnets move, the internal scraper bar follows.

BRIEF DESCRIPTION OF THE DRAWINGS

The features and advantages of the present invention are further set forth in the following detailed description taken in conjunction with the appended drawing illustrating a preferred embodiment.

DETAILED DESCRIPTION OF THE INVENTION

Referring to the drawing, the flushing liquor system of the invention comprises generally a decantation vessel 10, a flushing liquor collecting tank 11, and a tar dehydrating vessel 12. In the operation of the system, the flushing liquor containing tar and solids from the coke liquid flows out of vessel 10 to collecting tank 11, tar flows out to dehydrating vessel 12, and solids flow out through a conveyor 13.

Decantation vessel 10 has a continuous outer shell 21 and is supported by legs 23. The vessel is of circular cross section but with varying cross sections at different elevations. The upper portion 25 has a generally frusto-conical configuration and the lower portion 27 has an inverted cone configuration.

As is conventional, the flushing liquor from a battery of coke ovens flows through a seal trap where the liquor is separated from the non-condensable gas leaving the suction main and then through a separate pipe to decantation vessel 10. The liquor enters the decantation vessel 10 at the top and descends downwardly in the vessel. The rate of movement of the liquid diminishes, due to the increasing diameter of the cross-section of the vessel at upper portion 25 and the large volume of existing liquid.

Tar settles out of the liquor and collects in the conical portion 27. During equilibrium or steady state operation, a liquid-tar interface 30 exists in the vessel 10.

Clear liquid flows from a flushing liquor outlet 36 adjacent the top of vessel 10 to collecting tank 11. Outlet 36 can be displaced at any angular attitude relative to inlet 29 and retains the hydrostatic pressure due to the height of the valved distribution port 32 relative to the height of the fluid in the vessel 10. Thus a tube 31 extends downwardly from the top 33 of vessel 10 to a substantial distance above the interface level 30. The lower portion 34 of tube 31 is of reduced diameter so as to decrease any turbulence due to the existing of the clear liquid. The liquid in tube 31, of course, rises to the elevation of the liquid at the inlets. Tube 36 connects with tube 31 to form the outlet. Clear liquor flows from the decantation vessel to a vertical cylindrical liquor collecting tank 11 as is conventional and surplus liquor may flow over a weir 37 to valved distribution port 32 and thence by gravity flow to one of the conventional ammonia liquor storage tanks (not shown) for further processing. Liquor may also be removed to ammonia storage tanks through lower closeable outlet 38.

Tar is also withdrawn in a manner to take advantage of the hydrostatic pressure. Extending downwardly from the top and into the tar phase and within tube 31 is another tube 40 of lesser diameter. Tube 40 terminates with a conical shape skirt portion 41 in close proximity to the walls of cone portion 27. The separated tar flows under the lower extremity of the skirt 41 and exits through conduit 47 to the top of adjacent dehydration vessel 12. The liquid tar interface 30 level in the decantation vessel 10 is regulated by a differential pressure/- flow controller 45, such for example, as described in U.S. Pat. No. 4,140,143, mounted within the central tube 40.

It will be noted that the outflow of tar through conduit 47 and the outflow of clear liquid from outlet 36 are subject to the hydrostatic head resulting from the level 32 of fluid in vessel 11. These two outflows are separate and at vertically different locations.

At the bottom of the decantation vessel a tar scraper 60 is provided. The scraper 60 is held to the conical surface by two magnets 62,63 mounted on a carriage 64 moving on a circular track 65. The magnet carriage travels slowly around the vessel. Heavy tar and coal dust is removed from the vessel by means of an insulated external tubular conveyor 66. The initial sprocket box has a fluid bed drain 70 back to the decantation vessel. The tar-dust sludge flows from the collection box to a sludge removal section 71. Removed sludge is processed through a ball mill or other treatment system. After the sludge removal, the flights of the tubular conveyor 66 are sprayed by sprayer 73 then continue around the loop.

A spraying sparger 75 is provided at the base of the cone section to dislodge any accumulations in the valve and transition section.

The decantation vessel is insulated with conventional type insulation 76 to retain the heat of the system.

Vessel 12 is fitted with internal heaters 80 to produce a tar product with a controlled water content exiting the vessel from under the conical deflector 82 at the bottom of the vessel. The elevation of the tar level in the dehydration vessel is controlled by an internal pressure dip tube 83 and another differential pressure/flow controller 84. Varying pressures in the dip tub in turn control the valve or valves in the gravity lines to the tar storage tanks.

A sparger spray 88 is provided at the base of the tar dehydration vessel 12 to dislodge any blockage at the drain connection, additionally, a ram seal valve is additionally employed to assure free flow.

A major benefit derived from the arrangement of equipment in accordance with this invention is a gain of hydrostatic pressure or liquor head on the subsequent cooling liquor pumps and gravity flow of excess liquor to the ammonia liquor storage tanks instead of pumping as is usually done. With this hydrostatic head, dehydrated tar flows by gravity from the dehydration vessel.

The foregoing has presented a novel decantation arrangement that employs a vertical circular type liquor decanting vessel as opposed to convention flat, yard-mounted, rectangular cross-sectioned decanter tank to give an appreciable savings of yard space requirements for equipment and vessels, it further permits utilization of available hydrostatic heads resulting in a reduction in horsepower requirements for recirculating liquor pumps, and permits gravity flow of crude ammonia liquor and tar to collecting and storage tanks instead of the need to pump these fluids to tanks as in the heretofore known arrangements.

Additionally, by use of the vertical decantation vessel, considerable economies are realized in piping, pipe fittings, insulation, pipe racks, foundations, access walks, wiring, etc., when compared to conventional systems, and other economies in that the number and size of pumps and motors can be reduced by virtue of utilizing available fluid heads and gravity flow. As another feature, the removal of the sludge from the bottom of the decantation vessel and its transportation by means of a tube conveyor permits the further separation of the fluids and sludge can be processed by gravity from this point.

The invention is not limited to the embodiment described, but several modifications will be recognized by one skilled in the art as being feasible within the scope of the class.

What is claimed is:

1. An apparatus comprising components designed, arranged and dimensioned for processing flushing liquor to separate it into one aqueous portion, a tar portion, and a solid portion, including:
   (a) a vertically elongated vessel having a cross-section that is variable with the vertical elevation;
   (b) flushing liquor inlet means adjacent the top of the vessel for receiving flushing liquor that contains tar and solids so as to form in said vessel a lower tar phase and an upper liquid phase such that a tar and liquid interface is formed between said phases;
   (c) clear liquor outlet means adjacent the top of the vessel and displaced from the inlet means for removing flushing liquor from the vessel;
   (d) means for removing tar at a selected location from the lower section of the vessel;
   (e) means for receiving solids from the bottom of the vessel;
   (f) a first vertical tube extending downwardly through the liquid phase and into the tar phase and a first lateral tube connecting with said first vertical tube to remove tar from the first vertical tube to the means for removing tar at a selected location from the lower section of the vessel; and
   (g) a second vertical tube extending downwardly into the liquid phase such that its lower end is upwardly spaced from the tar and liquid interface and a second lateral tube connecting with said second vertical tube to remove liquid from the second vertical tube to the clear liquor outlet means.

2. The apparatus as defined in claim 1 wherein the vertically elongated vessel has an upper part which is frusto-conical in shape and a lower part which is in the shape of an inverted cone.

3. The apparatus as defined in claim 2 wherein means are provided to interiorly scrape the lower part of the elongated vessel.

4. The apparatus as defined in claim 3 wherein conveyor means are positioned below the lower part of the elongated vessel to remove the solid portion of the flushing liquor.

5. The apparatus as defined in claim 3 wherein the means to interiorly scrape the lower part of the elongated vessel in moved by magnets mounted in external relation to the vessel.

6. The apparatus as defined in claim 1 wherein the first lateral tube connects the elongated vessel to a dehydration vessel.

7. The apparatus of defined in claim 1 wherein the second lateral tube connect the elongated vessel to a liquid collecting tank.

8. The apparatus as defined in claim 1 wherein the first vertical tube is outwardly flared at its lower end.

9. The apparatus as defined in claim 1 wherein the second vertical tube concentrically surrounds the first vertical tube.

* * * * *